2,943,978
// Patented July 5, 1960

2,943,978

ALLOPREGNANE COMPOUNDS FOR TOPICAL APPLICATION

Lewis H. Sarett, Princeton, N.J., assignor to Merck & Co., Inc., Rahway, N.J., a corporation of New Jersey No Drawing. Filed Apr. 1, 1955, Ser. No. 498,753

6 Claims. (Cl. 167—58)

This invention relates to therapeutic compositions and particularly to such compositions containing as the effective ingredient an allopregnane compound for topical application where cortisone therapy is indicated.

The topical application of hormones such as hydrocortisone and related compounds has found widespread use in the treatment of topical afflictions, such as dermatitis, acute sunburn, poison ivy, poison oak, eczema, atopic dermatitis, pruritus ani, pruritus vulvae, allergies and the like. They have also produced favorable clinical response in diseases of the skin, such as neurodermatitis, lichens simplex, chronicus, seborrheic dermatitis and recunent vesicular dermatitis. The effect of such compounds on poison ivy, poison oak and similar afflictions has been startling, indicating that these scourges of children and weekend woodsmen which caused widespread suffering in the summer can at last be eliminated or substantially reduced. This remarkable characteristic has, however, been substantially limited due to the high systemic activity of the compounds. The danger of the active compounds being absorbed into the system with the resulting hormone unbalance has substantially limited the compounds' potential widespread use.

A primary object of the invention is to provide a therapeutic treatment for topical afflictions responding to cortisone therapy without the simultaneous introduction of harmful effects. A more specific object is to provide a topical composition having a high order of local activity. Other objects and the advantages of the invention will appear hereinafter.

These objects are attained, in general, by the use of a therapeutic composition comprising an intimate mixture of an allopregnane compound with a topical vehicle. This composition greatly extends the application of hormone therapy to topical afflictions.

The term allopregnane compound is meant to embrace those compounds having the structural formula:

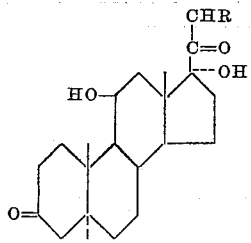

wherein R is a divalent functional group, a monovalent functional group and hydrogen, or two monovalent functional groups. These functional groups can be oxygen, hydrogen or alkoxy or acyloxy groups preferably having a carbon chain length of from one to twelve carbon atoms, phosphate or its salts such as the alkali metal salts, or alkali metal and alkaline earth metal bisulfite addition salts of the aldehyde. The discovery that these compounds have topical activity is surprising since they have a completely saturated ring system. Heretofore it was believed that one of the structural features of adrenal cortical steroids necessary for activity was a double bond at the 4,5 position. Typical examples of such allopregnane compounds are allopregnane-11β,17α,21-triol-3,20-dione 21-acetate;
allopregnane-11β,17α,21-triol-3,20-dione 21-propionate;
allopregnane-11β,17α,21-triol-3,20-dione 21-phosphate;
allopregnane-11β,17α,21-triol-3,20-dione 21-benzoate;
allopregnane - 11β,17α,21 - triol - 3,20 - dione 21-tricarballylate;
allopregnane - 11β,17α,21 - triol - 3,20 - dione 21 - trimethylacetate;
allopregnane-11β,17α,21-triol-3,20-dione 21-salicylate;
allopregnane-11β,17α,21-triol-3,20-dione 21-palmitate;
allopregnane-11β,17α,21-triol-3,20-dione 21-stearate;
sodium salt of allopregnane-11β,17α,21-triol-3,20-dione 21-phosphate;
and other alkali metal salts thereof;
allopregnane-11β,17α-diol-3,20-dione 21-al and alkali metal bisulfite derivatives thereof;
allopregnane-11β,17α,21,21-tetraol-3,20-dione;
21,21-dimethoxy-allopregnane-11β,17α-diol-3,20-dione;
21,21-diethoxy-allopregnane-11β,17α-diol-3,20-dione;
allopregnane-11β,17α,21,21-tetraol-3,20-dione 21,21-diacetate;
and allopregnane-11β,17α,21,21-tetraol-3,20-dione 21,21-dibutyrate.

By the term topical vehicle is meant a vehicle for topical application of such consistency that it may be readily applied to the skin, eyes, nose, mouth, teeth or respiratory tract. Examples of the dermatological vehicles which can be employed are vehicles of the water-soluble ointment base type, such as polyethylene glycols; vehicles which act as oils, such as the water-immiscible olive oil or petrolatum, water-miscible oils, such as anhydrous wool fat, oil-in-water emulsions, such as vanishing creams, water-in-oil emulsions, such as hydrous wool fat, pastes, such as a mixture of starch and petrolatum, collodions; vehicles which act as aqueous mixtures, such as aqueous solutions, mixtures of zinc oxide and water, and jellies; and vehicles which act as powders, such as the hydrophilic powders of which starch is an example or hydrophobic powders, such as talc or zinc stearate.

The particle size of the allopregnane compound present in these compositions is desirably less than 100 microns and preferably less than 35 microns. Very satisfactory results are obtained when the particle size of the active ingredients is 10 to 15 microns or less.

Although the concentration of the active ingredient can be varied within wide limits it is preferred to employ the allopregnane compound in an amount of at least 0.01% of the composition, depending on the particular dermatologic vehicle and the use intended. Although there is no limit on the concentration of the active ingredient from the standpoint of treatment it is ordinarily considered unnecessarily wasteful of the valuable steroid to prepare compositions having an excess of about ten percent by weight of the active ingredient in the composition. The vehicles containing from about 0.1% to about 5% of the allopregnane compound are believed to be particularly satisfactory.

The compositions of this invention can also contain, in addition to the allopregnane compound, other active ingredients, such as antibiotic agents. Such compositions containing mixtures of allopregnane compounds and an antibiotic agent are particularly useful in the treatment of inflammatory diseases which are complicated by concurrent infection. Antibiotic agents which can be utilized in these compositions include penicillin, streptomycin, neomycin, aureomycin, terramycin, chloromycetin, polymycin, tetracyclin and sulfonamides.

The antibiotic is preferably present in amounts of from about 100 units to 100,000 units in each dosage unit.

A particularly satisfactory soft white ointment for treating poison ivy and the like consists of approximately 0.5% of an allopregnane compound in an oily base. It is ordinarily prepared by adding a suspension of an allopregnane compound such as allopregnane-11β,17α, 21-triol-3,20-dione 21-acetate to a mixture of white wax and petrolatum. The ointment is preferably milled after compounding to eliminate crystalline agglomerates or lumps and to produce a smooth white preparation. Milling the finished product in this manner provides an ultimate means of reducing the particle size of the allopregnane to the desired range.

Other pharmaceutical carriers can be employed in preparing such topical ointments; for example, the active ingredient can be mixed with water-immiscible or water-miscible oils, such as petrolatum, lanolin or other suitable oil bases.

In addition to the topical ointments described above, lotions designed for application to the skin may be employed. These are conveniently prepared by suspending the active material in a suitable aqueous vehicle comprising mainly glycerol, alcohol, soap, and water.

A further type of topical preparation is a cosmetically acceptable vanishing cream containing an allopregnane compound. Suitable bases for this cream are typical oil-in-water emulsions comprising a soap emulsifying agent, free stearic acid and water to which other materials, such as glycerin, mineral oil, cocoa butter, etc. are sometimes added.

Still another type of preparation suitable for dermatological use is a dusting powder containing an allopregnane compound or one of its derivatives as the active ingredient and talc or the like.

A satisfactory ointment for treating inflammatory conditions of the skin accompanied by the infections comprises approximately one to fifty milligrams of an allopregnane compound and 500 to 10,000 units of an antibiotic in an ointment base. Examples of suitable bases are liquid petrolatum and white petrolatum, white wax and the like.

It is current medical and pharmaceutical practice to standardize on preparations which contain uniform amounts of active ingredients; and, therefore, compositions for treating skin irritations and infections are prepared for convenience containing ½ milligram, 1 milligram, 3 miligrams, 5 miligrams, 10 milligrams and 15 milligrams of an allopregnane compound and these could be combined with 500 units, 1000 units and 10,000 units of an antibiotic.

The following examples are given for the purpose of illustration:

EXAMPLE 1

*Allopregnane-11β,17α,21-triol-3,20-dione 21-acetate*

Five grams of hydrocortisone acetate are suspended in 500 ml. of benzene-methanol (9 to 1), 5.0 grams of 5% palladium barium sulfate catalyst added, and the mixture shaken at room temperature under hydrogen. The initial pressure is forty pounds. After two hours hydrogen absorption stops. The solvent is filtered from the catalyst and concentrated to 100 ml.; 300 ml. of ethanol is added and concentration continues until crystallization begins. After cooling a first crop of 3.1 grams, melting point 210–213° C., $[\alpha]_D^{25}$ +83° C. (acetone) of allopregnane-11β, 17α,21-triol-3,20-dione 21-acetate is obtained.

EXAMPLE 2

*Allopregnane-11β,17α,21-triol-3,20-dione*

To 8.8 grams of allopregnane-11β,17α,21-triol-3,20-dione 21-acetate in 400 ml. of methanol under nitrogen is added 13.5 ml. of 2 N sodium methoxide. The mixture is stirred for fifteen minutes at room temperature, 4.1 ml. of glacial acetic acid added, and stirring continued five minutes longer. Then 300 ml. of water is added and the whole concentrated to one-half volume. Another 300 ml. of water is added and again it is concentrated to half volume giving crystals. After cooling to 0° C. the crystalline product is collected and recrystallized from acetone, melting point 227–235° C.

EXAMPLE 3

*Allopregnane-11β,17α,21-triol-3,20-dione 21 t-butylacetate*

One gram of hydrocortisone t-butylacetate in 110 ml. of benzene-methanol (10:1) is reduced under an initial forty pounds of hydrogen pressure in the presence of 1.5 grams of 5% palladium supported on barium sulfate. After four hours about one equivalent of hydrogen is absorbed; the mixture is filtered and concentrated to 25 ml. Addition of petroleum ether produces crystalline product which is recrystallized from benzene to give substantially pure allopregnane-11β,17α,21-triol-3,20-dione 21-tertiary butylacetate of melting point 245–250° C. In a manner similar to this other 21 esters can be prepared such as the propionate, benzoate, tricarbyllate, trimethylacetate, salicylate and palmitate.

EXAMPLE 4

*Topical ointment of allopregnane-11β,17α,21-triol-3,20-dione 21-acetate*

| | Gm. |
|---|---|
| Allopregnane - 11β,17α,21 - triol - 3,20 - dione 21-acetate | 0.025 |
| Zinc stearate | 0.063 |
| Propylene glycol | 0.307 |
| Carbowax 1500 | 0.380 |
| Carbowax 4000 | 0.180 |
| Distilled water | 0.045 |
| | 1.000 |

Melt the carbowaxes and with stirring add the propylene glycol, zinc stearate and water. Pass the resulting ointment through a roller mill using cold rollers until the ointment is smooth. The resulting ointment is especially suited for dermatologic use.

EXAMPLE 5

*Topical ointment of allopregnane-11β,17α,21-triol-3,20-dione 21-tertiary butylacetate*

| | Gm. |
|---|---|
| Allopregnane-11β,17α,21-triol - 3,20-dione 21-tertiary butylacetate | 0.010 |
| Zinc stearate | 0.078 |
| Propylene glycol | 0.307 |
| Carbowax 1500 | 0.380 |
| Carbowax 4000 | 0.180 |
| Distilled water | 0.045 |
| | 1.000 |

Melt the carbowaxes and with stirring add the steroid, propylene glycol, zinc stearate and water. Pass the resulting ointment through a roller mill using cold rollers until the ointment is smooth. The resulting ointment is especially suited for dermatologic use.

EXAMPLE 6

| | |
|---|---|
| Allopregnane-11β,17α,21-triol-3,20-dione 21-acetate | 6.0 gm. |
| Bacitracin | 8.0 gm. (400,000 units) |
| Liquid petrolatum | 96.5 gm. |
| White petrolatum | 289.5 gm. |

The liquid petrolatum and the white petrolatum are sterilized by heating at 150° C. for two hours. Approximately two-thirds of the liquid petrolatum and all of the white petrolatum are then combined aseptically in a sterile container. The mixture is heated until liquid, thoroughly mixed and then allowed to congeal. The allopregnane and bacitracin are mixed and comminuted in a sterile mortar. The remainder of the liquid petrolatum is then added to this mixture of solids and mixed well. The previously prepared petrolatum base is then added in portions and thoroughly mixed to form a homogeneous mixture. The ointment remains stable over an extended storage period and is especially suited for ophthalmic use.

EXAMPLE 7

The following ingredients are compounded in the same manner as described in Example 6:

| | |
|---|---|
| Sodium bisulfite addition product of allopregnane-11β,17α-diol-3,20-dione 21-al | 6.0 gm. |
| Bacitracin | 8.0 gm. (400,000 units). |
| Liquid petrolatum | 96.5 gm. |
| White petrolatum | 289.5 gm. |

The composition is useful as an ophthalmic ointment.

EXAMPLE 8

The following ingredients are compounded in the manner described in Example 6 with the exception that the white wax is first combined with the major portion of petrolatum base:

| | Gm. |
|---|---|
| Allopregnane-11β,17α,21-triol-3,20-dione 21-benzoate | 60.00 |
| Neomycin sulfate | 20.00 |
| White wax | 76.00 |
| White petrolatum | 2828.00 |
| Liquid petrolatum | 1016.00 |

The composition is useful as an ophthalmic ointment.

EXAMPLE 9

The following ingredients are compounded in the same manner as described in Example 8:

| | Gm. |
|---|---|
| Allopregnane-11β,17α,21-triol-3,20-dione 21-stearate | 60.00 |
| Tetracyclin | 20.00 |
| White wax | 76.00 |
| White petrolatum | 2828.00 |
| Liquid petrolatum | 1016.00 |

The ointment is particularly suited for ophthalmic use.

EXAMPLE 10

The following ingredients are compounded in the same manner as described in Example 8:

| | |
|---|---|
| Sodium salt of allopregnane-11β,17α,21-triol-3,20-dione 21-phosphate | 60.00 |
| dione 21-phosphate | 60.00 |
| Neomycin sulfate | 20.00 |
| Bacitracin | 100.00 |
| White wax | 74.00 |
| White petrolatum | 2743.00 |
| Liquid petrolatum | 1003.00 |

The composition is useful as an ophthalmic ointment.

EXAMPLE 11

A lotion is prepared having the following composition:

| | Gm. |
|---|---|
| Allopregnane-11β,17α,21-triol-3-20-dione | 1.00 |
| Neomycin base (as the sulfate) | 0.35 |
| Non-ionic emulsifying wax (Polawax) | 1.50 |
| Glyceryl monostearate | 0.60 |
| Glycerin | 2.00 |
| Liquid petrolatum | 10.00 |
| Lanolin anhydrous | 0.50 |
| Methyl-p-hydroxybenzoate | 0.15 |
| N-propyl-p-hydroxybenzoate | 0.02 |
| Water to make 100.00 gm. | |

The non-ionic emulsifying wax, glyceryl monostearate, liquid petrolatum and anhydrous lanolin are melted at 70° C. and stirred together. The methyl and N-propyl-p-hydroxybenzoates are dissolved in 70% of the water, previously heated to 80° C. This aqueous solution is then added to the melted waxes with thorough stirring to form an emulsion. The allopregnane is then milled together with the glycerol and 20% of the water thus forming a thin slurry. This slurry is then added to the previously formed emulsion and thoroughly stirred until the temperature of the lotion base is about 35° C. The neomycin sulfate is dissolved in 10% of the water (cool) and this solution is then added with stirring to the lotion base and the resulting mixture is homogenized.

EXAMPLE 12

An ointment is prepared having the following composition:

| | |
|---|---|
| Bacitracin | 2.0 gm. (100,000 units). |
| Allopregnane-11β,17α,21-triol-3.20-dione 21-acetate | 2.5 gm. |
| White wax | 4.0 gm. |
| White petrolatum to make 100.0 gm. | |

The white wax and petrolatum are melted on a steam bath and the mixture allowed to cool with stirring until it congeals. The hydrocortisone acetate and the bacitracin are incorporated by stirring in the cool base. The mixture is then milled in a roller mill until a uniform product is obtained. The resulting ointment is suitable for use in treating eye diseases.

EXAMPLE 13

An ointment is prepared as in Example 12 with the exception that 30 mg. of terramycin hydrochloride per gram of ointment is used in place of the bacitracin.

EXAMPLE 14

An ointment is prepared as in Example 12 with the exception that 0.5 mg. of tyrothricin per gram of ointment is used in place of the bacitracin.

EXAMPLE 15

An ointment is prepared as in Example 12 with the exception that 30 mg. of aureomycin hydrochloride per gram of ointment is used in place of the bacitracin.

EXAMPLE 16

An ointment is prepared as in Example 12 with the exception that 10,000 units of polymyxin B (as the sulfate) per gram of ointment is used in place of the bacitracin.

EXAMPLE 17

An ointment is prepared as in Example 12 with the exception that 5 mg. of gramicidin per gram of ointment is used in place of bacitracin.

EXAMPLE 18

An ointment is prepared as in Example 12 with the exception that 3.5 mg. of neomycin sulfate per gram of ointment is used in place of the bacitracin.

EXAMPLE 19

An ointment is prepared as in Example 12 with the exception that 10,000 units of penicillin G potassium per gram of ointment is used in place of bacitracin.

EXAMPLE 20

An ointment is prepared as in Example 12 with the exception that 10 mg. of dihydrostreptomycin sulfate per gram of ointment is used in place of the bacitracin.

EXAMPLE 21

An ointment is prepared as in Example 12 with the exception that 10 mg. of streptomycin sulfate per gram of ointment is used in place of the bacitracin.

EXAMPLE 22

An ointment is prepared as in Example 12 with the exception that 1,000 units of bacitracin and 3.5 mg. of neomycin sulfate per gram of ointment is used as the active component.

EXAMPLE 23

An ointment is prepared as in Example 12 with the exception that 2 gm. of d-4-amino-3-isoxazolidone is used in place of the bacitracin.

EXAMPLE 24

A sterile ophthalmic suspension having the following composition is aseptically prepared:

Suspension:
    Allopregnane - 11β,17α,21 - triol-3,20-dione
        21-acetate _____ mg__   25.0
    Neomycin base (present as the sulfate)
        (sterile) _____ mg__    3.5
    Sterilized vehicle to make 1.0 cc.
Vehicle:
    Sodium chloride_____mg__   4.8
    Sodium citrate.2H₂O_____mg__   1.0
    Sodium phosphate.2H₂O, monobasic__mg__   4.5
    Sodium phosphate, anhydrous, dibasic_mg__   4.5
    Carbowax 4000_____mg__ 100.0
    Tween 80_____mg__   0.2
    Benzylkonium chloride (12.8% solution) _____cc__ 0.0016
    Benzyl alcohol_____mg__   5.0
    Distilled water to make 1.0 cc.

The vehicle is prepared by dissolving the components of the vehicle in the water, clarified by filtration and sterilized by autoclaving. The sterile allopregnane is aseptically suspended in a portion of the sterilized vehicle and milled until 90% of the particles are below 10 microns in size. The sterile neomycin sulfate is aseptically dissolved in a portion of the sterilized vehicle and this solution added aseptically to the milled cortisone suspension. After thorough agitation, the suspension is aseptically diluted to volume with the sterilized vehicle.

EXAMPLE 25

An ophthalmic suspension is prepared in a manner similar to Example 24 with the substitution of 25 mg. of allopregnane-11β,17α,21-triol-3,20-dione 21-benzoate for the allopregnane - 11β,17α,21-triol-3,20-dione 21-acetate.

EXAMPLE 26

An ophthalmic suspension is prepared in a manner similar to Example 24 with the substitution of 12.5 mg. of allopregnane-11β,17α,21-triol-3,20-dione 21-benzoate for 12.5 mg. of the allopregnane-11β,17α,21-triol-3,20-dione 21-acetate.

Any departure from the above description which conforms to the present invention is intended to be included within the scope of the claims.

What is claimed is:

1. A therapeutic composition useful for the treatment of topical afflictions that comprises an intimate mixture of 0.01 to 10% by weight of an allopregnane compound having the formula—

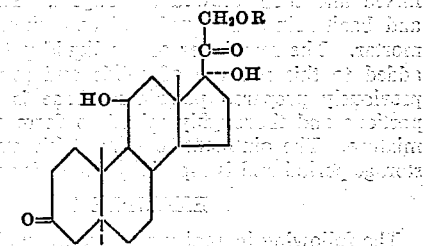

in an oil, wherein R is selected from the class consisting of hydrogen and lower acyl radicals.

2. The therapeutic composition of claim 1 wherein the allopregnane compound is allopregnane-11β,17α,21-triol-3,20-dione 21 acetate.

3. The therapeutic composition of claim 1 wherein the allopregnane compound is allopregnane-11β,17α,21-triol-3,20-dione.

4. The therapeutic composition of claim 1 wherein the allopregnane compound is allopregnane-11β,17α,21-triol-3,20-dione 21-t-butylacetate.

5. A therapeutic composition useful for the treatment of topical afflictions that comprises an intimate mixture of 0.01 to 10% by weight of an allopregnane compound having the formula—

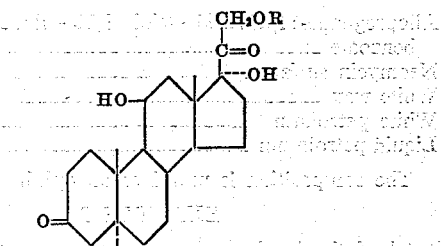

in an oil-in-water emulsion, wherein R is selected from the class consisting of hydrogen and lower acyl radicals.

6. A therapeutic composition useful for the treatment of topical afflictions that comprises an intimate mixture of 0.01 to 10% by weight of an allopregnane compound having the formula—

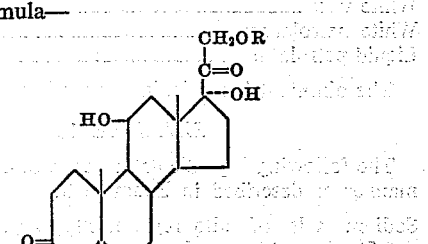

in a water-in-oil emulsion, wherein R is selected from the class consisting of hydrogen and lower acyl radicals.

References Cited in the file of this patent
UNITED STATES PATENTS

| | | |
|---|---|---|
| 2,649,402 | Murray | Aug. 18, 1953 |
| 2,783,226 | Gould | Feb. 26, 1957 |

OTHER REFERENCES

J. Biol. Chem., vol. 195, 1952, pp. 751–753.
Pincus: The Hormones, vol. 1, 1948, Academy Press Inc., N.Y., p. 556.
Modern Drugs: January 1953, p. 293.